US012745224B2

(12) United States Patent

Dutta et al.

(10) Patent No.: US 12,745,224 B2

(45) Date of Patent: Sep. 22, 2026

(54) SIGNALING FOR SIDELINK FEEDBACK CHANNEL COLLISION AVOIDANCE BETWEEN RADIO ACCESS TECHNOLOGIES

(71) Applicant: QUALCOMM Incorporated, San Diego, CA (US)

(72) Inventors: Sourjya Dutta, San Diego, CA (US); Jae Ho Ryu, San Diego, CA (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 335 days.

(21) Appl. No.: 18/467,287

(22) Filed: Sep. 14, 2023

(65) Prior Publication Data

US 2025/0097907 A1 Mar. 20, 2025

(51) Int. Cl.

*H04W 72/02* (2009.01)
*H04W 72/0446* (2023.01)
*H04W 72/25* (2023.01)
*H04W 72/40* (2023.01)
*H04W 72/56* (2023.01)

(52) U.S. Cl.

CPC ....... *H04W 72/0446* (2013.01); *H04W 72/25* (2023.01); *H04W 72/56* (2023.01)

(58) Field of Classification Search

CPC . H04W 92/18; H04W 72/0446; H04W 72/40; H04W 72/02; H04W 74/0808; H04W 72/23; H04W 72/25; H04W 76/14; H04W 72/569; H04W 4/40; H04W 24/10; H04W 72/20; H04W 72/56; H04W 16/14; H04W 88/06

See application file for complete search history.

(56) References Cited

U.S. PATENT DOCUMENTS

2019/0363843 A1* 11/2019 Gordaychik .......... H04W 28/16
2020/0382354 A1* 12/2020 Sengupta ................ H04L 5/001
2021/0022142 A1* 1/2021 Wu ........................ H04W 72/53
2022/0272709 A1* 8/2022 Jiang ...................... H04W 72/53
2023/0354270 A1* 11/2023 Lee ................... H04W 72/1215
2024/0032074 A1* 1/2024 Ye .......................... H04L 5/0064
2024/0349311 A1* 10/2024 Sun ......................... H04W 4/40
2025/0097719 A1* 3/2025 Yoshioka ............ H04W 52/242
2025/0185028 A1* 6/2025 Kiilerich Pratas .... H04W 72/25

* cited by examiner

*Primary Examiner* — Sai Aung

(74) *Attorney, Agent, or Firm* — Harrity & Harrity, LLP

(57) ABSTRACT

Various aspects of the present disclosure generally relate to wireless communication. In some aspects, a user equipment (UE) may identify a first resource for a sidelink feedback channel associated with the UE, wherein the sidelink feedback channel is associated with a first radio access technology (RAT). The UE may transmit, using a second RAT, a reservation for a second resource that overlaps the first resource. Numerous other aspects are described.

30 Claims, 10 Drawing Sheets

300

600

= PSCCH resources

= PSSCH resources

= PSFCH resources

900

SIGNALING FOR SIDELINK FEEDBACK CHANNEL COLLISION AVOIDANCE BETWEEN RADIO ACCESS TECHNOLOGIES

FIELD OF THE DISCLOSURE

Aspects of the present disclosure generally relate to wireless communication and to techniques and apparatuses for sidelink feedback channel collision avoidance between radio access technologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a first resource for a sidelink feedback channel associated with the UE, wherein the sidelink feedback channel is associated with a first radio access technology (RAT); and transmitting, using a second RAT, a reservation for a second resource that overlaps the first resource.

In some aspects, an apparatus for wireless communication at a UE includes one or more memories; and one or more processors, coupled to the one or more memories, configured to cause the UE to: identify a first resource for a sidelink feedback channel associated with the UE, wherein the sidelink feedback channel is associated with a first RAT; and transmit, using a second RAT, a reservation for a second resource that overlaps the first resource.

In some aspects, a non-transitory computer-readable medium storing a set of instructions for wireless communication includes one or more instructions that, when executed by one or more processors of a UE, cause the UE to: identify a first resource for a sidelink feedback channel associated with the UE, wherein the sidelink feedback channel is associated with a first RAT; and transmit, using a second RAT, a reservation for a second resource that overlaps the first resource.

In some aspects, an apparatus for wireless communication includes means for identifying a first resource for a sidelink feedback channel associated with the apparatus, wherein the sidelink feedback channel is associated with a first RAT; and means for transmitting, using a second RAT, a reservation for a second resource that overlaps the first resource.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
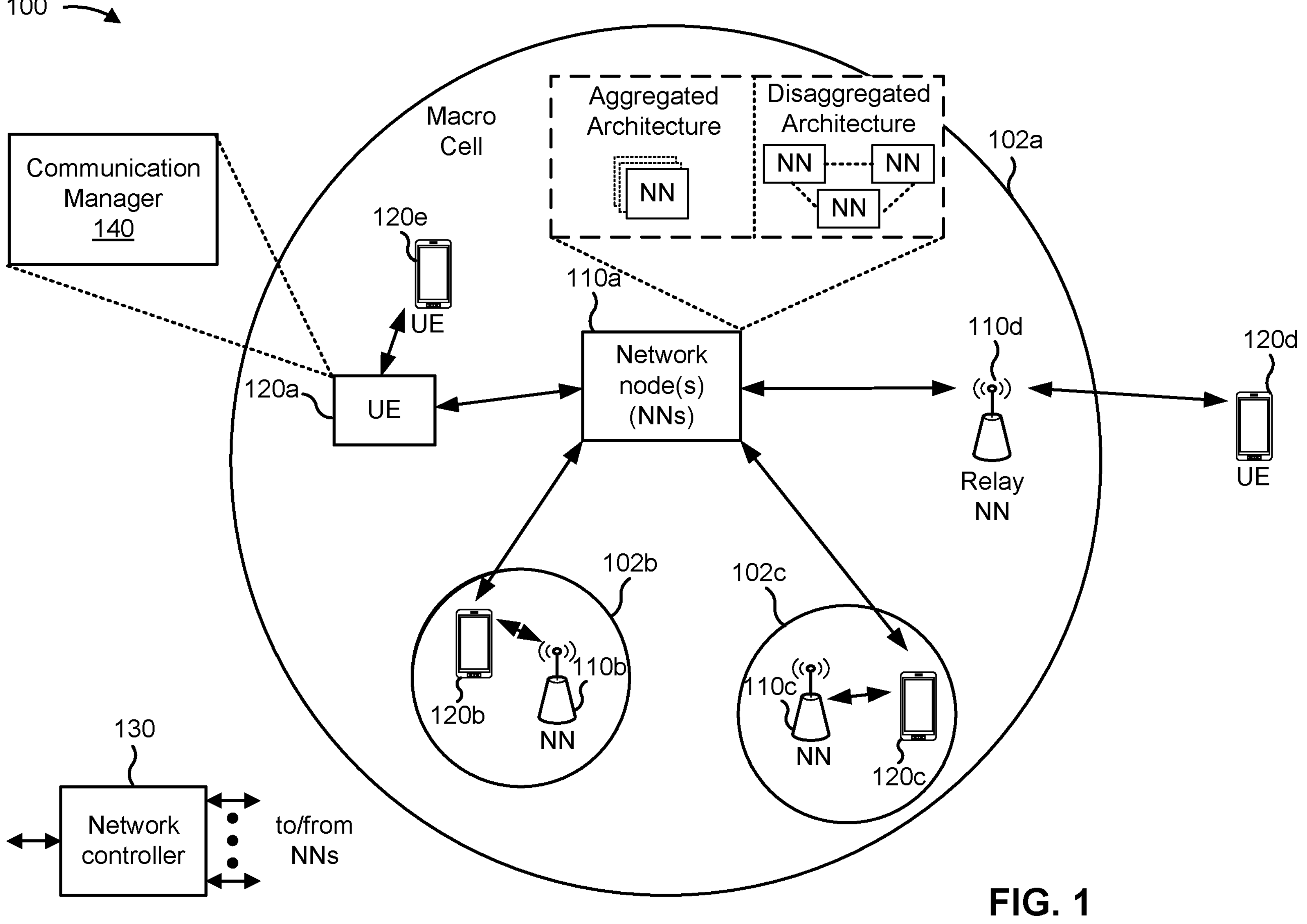
FIG. 1 is a diagram illustrating an example of a wireless network, in accordance with the present disclosure.

User equipments (UEs) may communicate directly with one another, such as via a sidelink. Sidelink communications differ from radio access communications (e.g., uplink and/or downlink communications) in that sidelink communications proceed directly from a transmitting UE to a receiving UE without traveling via an intermediary such as a network node. Sidelink communications may facilitate vehicle-to-everything (V2X) communications, such as Long Term Evolution (LTE) V2X and New Radio (NR) V2X.

Some radio access technologies (RATs), such as NR, may provide a sidelink feedback mechanism. For example, an NR sidelink (e.g., NR V2X) UE may support hybrid automatic repeat request (HARQ) feedback transmission regarding sidelink communications. Sidelink feedback transmission may occur on configured periodic resources, which may be associated with a gap between reception of a signal and transmission of the sidelink feedback.

In some scenarios, V2X deployments associated with multiple RATs may coexist on the same frequency spectrum (e.g., channel) and in the same area. For example, scarcity of spectrum may drive NR V2X and LTE V2X to be deployed on the same channel. Difficulties may arise when deploying NR V2X and LTE V2X in the same channel. For example, the presence of sidelink feedback resources for a first RAT (e.g., NR V2X sidelink feedback resources) in a resource pool shared with a second RAT that does not support sidelink feedback (such as LTE V2X) may lead to unexpected changes in received power for a UE utilizing the second RAT in the middle of a time interval such as a slot. This may degrade reception (e.g., desensitize a receiver) at the UE utilizing the second RAT if the UE is unaware of the presence of the sidelink feedback resources. While a transmitter can avoid certain resources to mitigate sidelink feedback resource collision with the UE utilizing the second RAT, this may lead to a reduction in the number of resources available for the transmitter, decreasing throughput.

Aspects of the present disclosure relate generally to sidelink communication. Some aspects more specifically relate to coexistence of multiple RATs for sidelink communication. In some aspects, a UE identifies a first resource for a sidelink feedback channel (such as a physical sidelink feedback channel (PSFCH)) associated with a first RAT (such as NR). The UE may transmit, using a second RAT (such as LTE) a reservation for a second resource that overlaps the first resource. Thus, the UE may notify other UEs (such as other UEs using the second RAT) to avoid the first resource in a fashion that the other UEs can process, thereby avoiding collision of communications of the other UEs with the sidelink feedback channel. In some aspects, the UE may identify the first resource according to signaling from a first module of the UE that is associated with the first RAT. For example, the UE may include an NR module and an LTE module, which may communicate with one another or with another module of the UE (such as one or more modems or one or more processors). The NR module may provide an indication of the sidelink feedback channel or the first resource. In some aspects, a periodicity of the sidelink feedback channel or the first resource may be based at least in part on a selectable periodicity of the reservation. For example, the periodicity of the sidelink feedback channel may be equal to, or a factor of, a periodicity that can be configured or selected for the reservation (e.g., an LTE sidelink reservation period). In some aspects, the reservation may indicate a priority. For example, the reservation may indicate a priority, associated with the second RAT (e.g., an LTE priority), that is based at least in part on a highest priority associated with the first RAT (e.g., a highest NR priority).

Aspects of the present disclosure may be used to realize one or more of the following possible advantages. In some aspects, by transmitting, using the second RAT, the reservation for the second resource that overlaps the first resource, the UE reduces degradation of reception performance at other UEs without decreasing the number of resources available for communication at the UE. In some aspects, by using the periodicity of the sidelink feedback channel that is equal to or a factor of the periodicity of the reservation (e.g., the LTE sidelink reservation period), the UE reduces overhead associated with the reservation by enabling alignment of the two periodicities. In some aspects, by providing a priority for the reservation, the UE enables prioritization of the reservation relative to other channels, improving efficiency of resource allocation on the sidelink.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 May include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a V2X protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a first resource for a sidelink feedback channel associated with the UE 120, wherein the sidelink feedback channel is associated with a first RAT; and transmit, using a second RAT, a reservation for a second resource that overlaps the first resource. Additionally, or alternatively, the communication manager 140 may perform one or more other operations described herein.

As indicated above, FIG. 1 is provided as an example. Other examples may differ from what is described with regard to FIG. 1.

Figure 2:
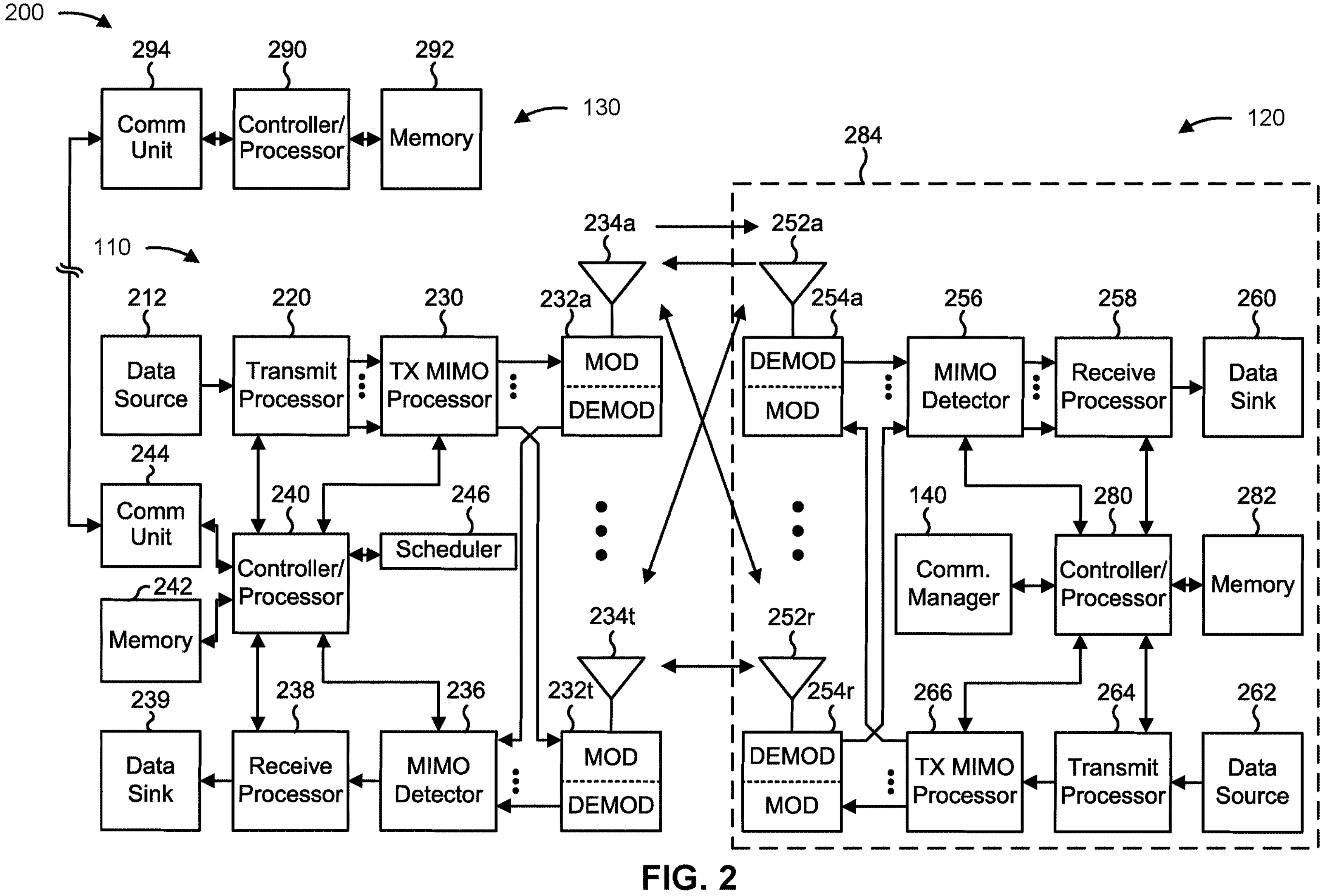
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the network node 110, the controller/processor 280 of the UE 120, and/or any other component(s) of FIG. 2 may perform one or more techniques associated with sidelink communication, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for identifying a first resource for a sidelink feedback channel associated with the UE, wherein the sidelink feedback channel is associated with a first RAT; and/or means for transmitting, using a second RAT, a reservation for a second resource that overlaps the first resource. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
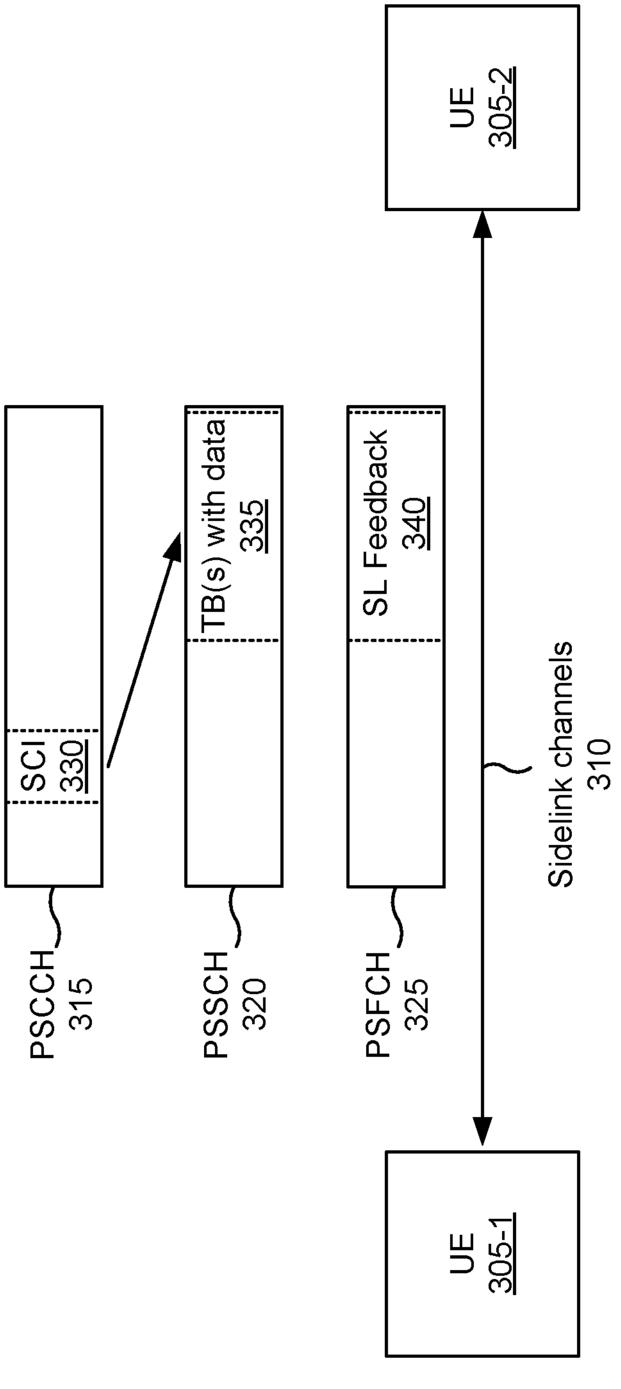
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) May correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
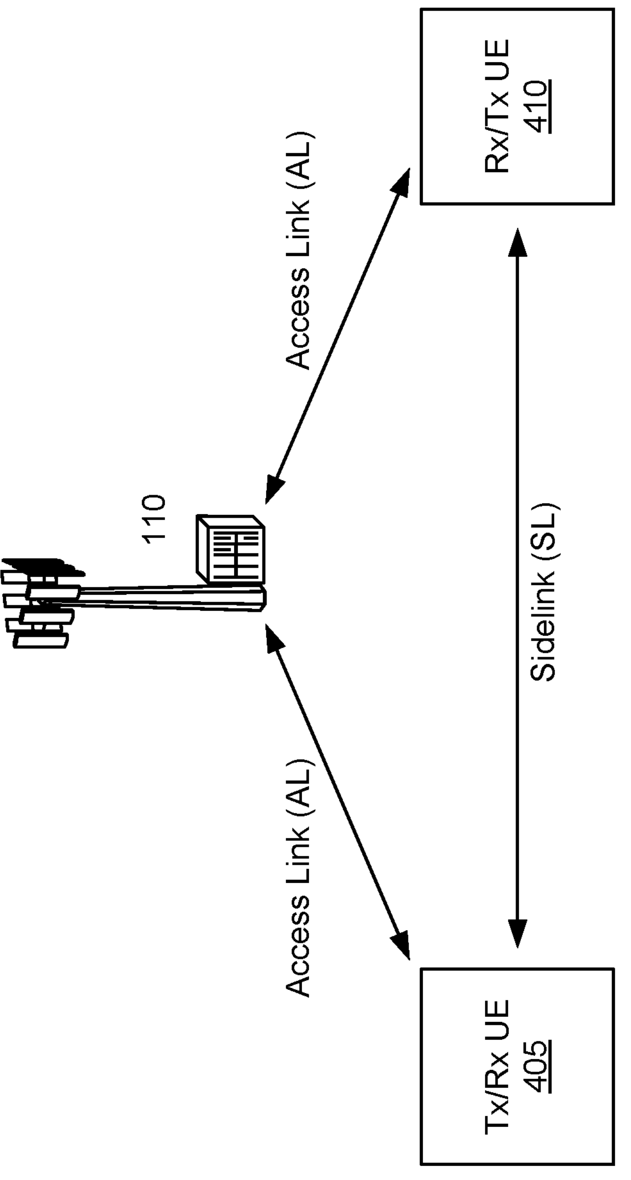
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
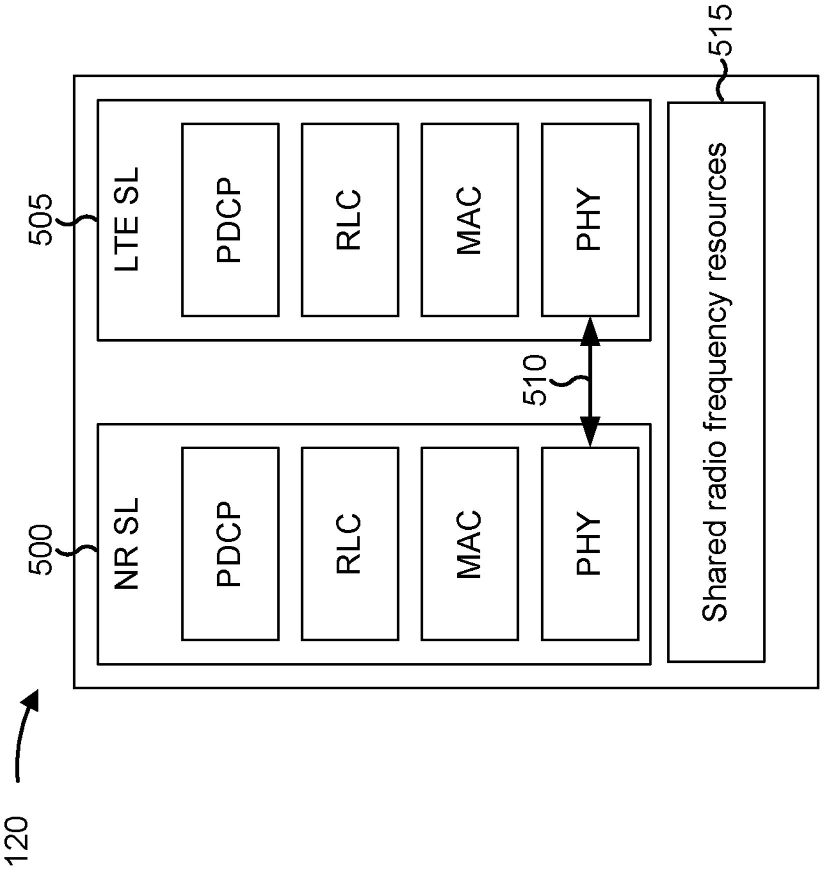
FIG. 5 is a diagram illustrating an example of a UE including a first module and a second module, in accordance with the present disclosure.

FIG. 5 is a diagram illustrating an example of a UE 120 including a first module 500 and a second module 505, in accordance with the present disclosure. The first module 500 may be associated with a first RAT, and the second module 505 may be associated with a second RAT. For example, the first RAT may be a 5G or NR RAT (e.g., 5G/NR), and the second RAT may be a 4G or LTE RAT (e.g., 4G/LTE). In some aspects, the first RAT may support sidelink communication (e.g., NR sidelink, NR V2X), and the second RAT may support sidelink communication (e.g., LTE sidelink, LTE V2X). In some aspects, the first module 500 and the second module 505 may be co-located in a same device (e.g., UE 120) or platform. A UE that implements a first module 500 and a second module 505 may be referred to as a dual RAT UE (e.g., NR sidelink and LTE sidelink).

The first module 500 may include a first protocol stack that supports the first RAT. The second module 505 may include a second protocol stack that supports the second RAT. As shown, each of the first protocol stack and the second protocol stack may include a packet data convergence protocol (PDCP) entity, a radio link control (RLC) entity, a medium access control (MAC) entity, and a physical (PHY) entity. A given entity may implement corresponding protocol layer functionality according to the corresponding RAT. For example, the PDCP entity may implement PDCP layer functionality, the RLC entity may implement RLC layer functionality, the MAC entity may implement MAC layer functionality, and the PHY entity may implement PHY layer functionality. As shown, the first module 500 and the second module 505 may communicate with one another via an interface 510, which may be implemented between the PHY entities of the first module 500 and the second module 505 in some examples. The interface 510 may include a shared hardware and/or software module.

As shown by reference number 515, the first module 500 and the second module 505 may use shared radio frequency (RF) circuitry. In this context, shared RF circuitry may include RF components of the UE 120, such as one or more RF chains (e.g., which may include one or more antennas, one or more processors, one or more amplifiers, one or more analog to digital converters, one or more digital to analog converters, one or more modems, or the like). The one or more RF chains may individually or collectively perform communications in association with (e.g., under the control of, according to instructions provided by) the first module 500 or the second module 505.

The first module 500 and the second module 505 may share information with one another via the interface 510. For example, the first module 500 may perform dynamic resource pool sharing in the first RAT based at least in part on LTE sidelink resource information shared by the second module 505 via the interface 510. The LTE sidelink resource information may include future resource reservation information received from neighboring LTE sidelink devices along with associated RSRP information and priorities. The future resource reservation information may indicate future resources that the second module 505 has selected or reserved for its own transmission.

Coexistence between the first module 500 and the second module 505 may involve some challenges, such as with regard to dynamic resource sharing by the first module 500. For example, the presence of PSFCH resources in a sidelink resource pool shared with the second module 505 may mean that without any coordination, the NR PSFCH transmissions of the first module 500 will degrade LTE transmissions. This is because the power received by LTE UEs will change in the middle of the slot and desensitize an LTE receiver of the LTE UEs. For example, a slot may be used for PSFCH transmission and not for PSSCH transmission, leading to a lower signal strength in the PSSCH resources and a higher signal strength in the PSFCH resources, which is not expected by LTE UEs. Furthermore, an LTE PSSCH, which may occupy an entire slot, may overlap with a PSFCH, so receivers of the LTE PSSCH may have difficulty receiving the LTE PSSCH. Some techniques described herein provide transmission of a reservation (e.g., by the second module 505) of a resource that overlaps a PSFCH resource of the first module 500, such that the neighboring LTE sidelink devices may avoid communication on the PSFCH resource.

As indicated above, FIG. 5 is provided as an example. Other examples may differ from what is described with regard to FIG. 5.

Figure 6:
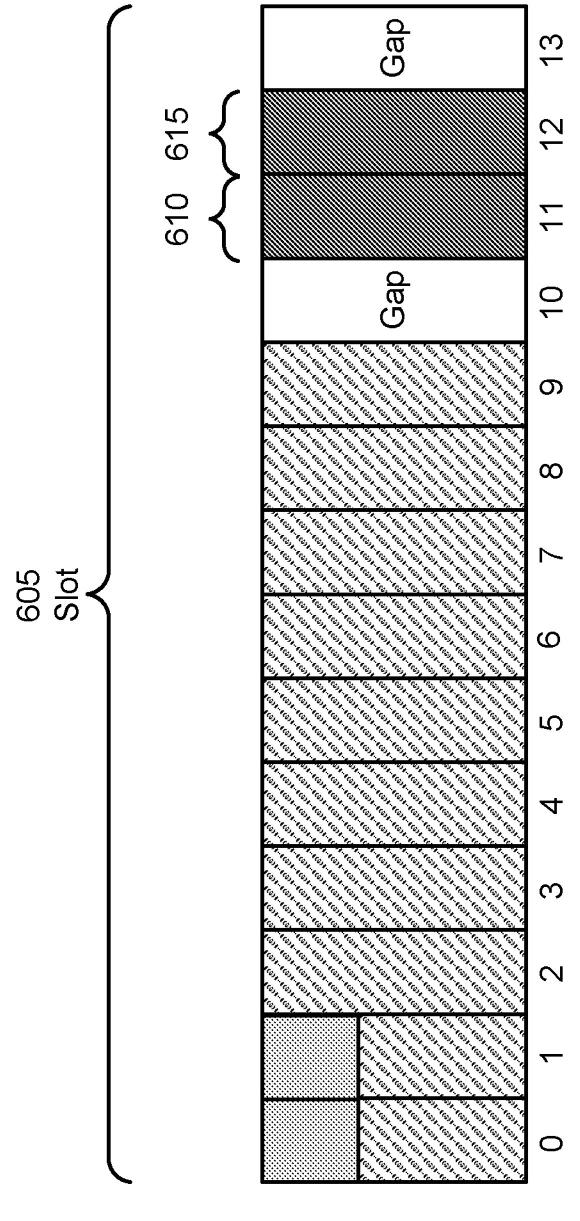
FIG. 6 is a diagram illustrating an example of a sidelink slot format that includes physical sidelink feedback channel (PSFCH) resources, in accordance with the present disclosure.

FIG. 6 is a diagram illustrating an example of a sidelink slot format 600 that includes PSFCH resources, in accordance with the present disclosure. As shown in FIG. 6, a slot 605 (e.g., a sidelink slot) may include multiple symbols 610 (e.g., 14 symbols 610 as shown in FIG. 6). The slot 605 may include a set of time-frequency resources (such as resource elements (REs)) that are associated with, or reserved for, transmissions via the PSCCH. Additionally, the slot 605 may include a set of time-frequency resources (such as REs) that are associated with, or reserved for, transmissions via the PSSCH. Further, the slot 605 may include a set of time-frequency resources (such as REs) that are associated with, or reserved for, transmissions via the PSFCH.

A PSCCH, a PSSCH, and a PSFCH may be transmitted within a same slot (e.g., the slot 605). The PSCCH may occupy up to one subchannel with a lowest subchannel index. SCI-1 may be transmitted in the PSCCH and may indicate information regarding a PSSCH bandwidth and resource reservations in upcoming slots. The PSCCH may be configured (or preconfigured) to occupy 10, 12, 15, 20, or 25 physical resource blocks (PRBs), and may be limited to one subchannel, where each sub-channel may occupy 10, 15, 20, 25, 50, 75, or 100 PRBs. A PSCCH duration may be configured (or preconfigured) to two or three symbols. A PSCCH size may be fixed for a resource pool. The PSSCH may occupy up to $$N^{SL}_{subchannel}$$

contiguous subchannels. SCI-2 may be decoded after decoding the PSCCH. In other words, the PSSCH may occupy at least one subchannel and may contain the SCI-2. In some aspects, at least one symbol in the slot 605 may be an automatic gain control (AGC) symbol.

In some examples, a UE may transmit or receive HARQ feedback via the PSFCH (such as the PSFCH 325). The PSFCH may be configured, or enabled, for unicast transmissions (e.g., for one-to-one communications) or for groupcast transmissions (e.g., for one-to-many communications). A PSFCH transmission may include one bit indicating ACK feedback or NACK feedback. For groupcast transmissions, in some cases, a PSFCH transmission may be associated with NACK feedback (e.g., a UE may transmit the PSFCH transmission to indicate NACK feedback and may not transmit the PSFCH transmission to indicate ACK feedback). Alternatively, for groupcast transmissions, a PSFCH transmission may be associated with ACK feedback and NACK feedback. A PSFCH transmission may indicate HARQ feedback (e.g., ACK/NACK feedback) for a transmission that is received K slots prior to the transmission of the PSFCH transmission (e.g., K slots prior to the slot 605). A value for K may be configured for a UE and may be 2, 3, or another quantity of slots. HARQ feedback on the sidelink may be considered an NR sidelink feature. For example, the first module 500 may support HARQ feedback on the sidelink, and the second module 505 may not support (or may not perform) HARQ feedback on the sidelink. In some aspects, sidelink transmissions on an LTE RAT (e.g., performed or controlled by the second module 505) may include two transmissions of a given communication without feedback. HARQ feedback may enable support for advanced traffic types (e.g., larger packets, lower latencies) and may maintain a threshold reliability.

A UE may receive (such as from a network node 110 or another control entity) a PSFCH configuration. The PSFCH configuration may be associated with, or included in, a sidelink resource pool configuration. The PSFCH configuration may indicate a periodicity associated with the PSFCH. The periodicity may indicate how often, in terms of a quantity of slots, resources are to be reserved for the PSFCH. For example, the periodicity may be associated with values of 0 (e.g., indicating that the PSFCH is disabled or not configured), 1 (e.g., indicating that each slot includes resources reserved for the PSFCH), 2 (e.g., indicating that every other slot includes resources reserved for the PSFCH), 4 (e.g., indicating that every $4^{th}$ slot includes resources reserved for the PSFCH), or another value. The PSFCH configuration may indicate a time gap (e.g., a minimum time gap) between the resources reserved for the PSFCH and an associated PSSCH reception (e.g., the resources reserved for the PSFCH may be used by the UE to transmit ACK/NACK feedback for the associated PSSCH reception). The time gap may be defined in terms of a quantity of slots, such as 2 slots, 3 slots, or another quantity of slots.

The PSFCH configuration may indicate a quantity of multiplexing cyclic shifts. For example, because the PSFCH may re-use the PUCCH format 0, the PSFCH may be associated with 2 base sequences with one or more allowed cyclic shifts (e.g., to mitigate a risk of a collision or interference with a PSFCH transmission from another UE using the same time-frequency resources). The PSFCH configuration may indicate resources reserved for the PSFCH. For example, a configuration parameter (such as an rbSetPSFCH parameter, as defined, or otherwise fixed, by a wireless communication standard) may indicate a set of PRBs that are reserved for the PSFCH (e.g., a set of PRBs, from a resource pool, for PSFCH transmission).

For example, the PSFCH may be mapped to one RB. The configuration parameter (such as the rbSetPSFCH parameter) may provide the set of PRBs available for the PSFCH in the resource pool. A UE may identify candidate RBs for the PSFCH for a subchannel, j, and a slot, i. The UE may allocate the $[(i+j\cdot N_{PSFCH})\cdot M_{Subc,slot}]$ to $[(i+1\cdot jN_{PSFCH})\cdot M_{Subc,slot}-1]$ RBs for the PSFCH. $N_{PSFCH}$ may be a quantity of slots associated with the PSFCH (e.g., indicated by the periodicity associated with the PSFCH). $M_{Subc,slot}$ may be a quantity of the RBs, defined by $$M_{Subc,slot}=\frac{\#\text{ of } RBS \text{ allocated for the } PSFCH \text{ (by the } rbSetPSFCH \text{ parameter)}}{(\text{value for the periodicity of the } PSFCH\cdot \text{a quantity of subchannels associated with the } PSFCH)}.$$

For example, if $N_{PSFCH}$ is 2 and $M_{Subc,slot}$ is 5, and j is 0, then RBs [0 to 4] for i=0 and RBs [5 to 9] for i=1 may be reserved for the PSFCH by the UE. The UE may determine resources for multiplexing the PSFCH as $R=N_{type}\cdot M_{Subc,slot}\cdot\#CS$, where $N_{type}$ is a value configured for the PSFCH associated with a starting subchannel of the PSFCH, and where #CS is the configured quantity of the cyclic shift for the PSFCH. The UE may select an RB, from the RBs reserved for the PSFCH in accordance with $(P_{ID}+M_{ID})\bmod R$, where $P_{ID}$ is an identifier of the transmitter (e.g., of the UE), and where $M_{ID}$ is a receiver identifier for groupcast transmissions (if not a groupcast, $M_{ID}=0$).

A PSFCH transmission may be duplicated in a preceding symbol. For example, as shown in FIG. 6, two symbols 610 and 615 may be allocated for the PSFCH. A second symbol 615 may include the RB selected by the UE for the PSFCH transmission and a first symbol 610 may include a duplicated (e.g., identical) version of the PSFCH transmission. For example, the first symbol may be used for AGC operations by a receiver. In other words, the PSFCH transmission may be associated with a single RB in a single symbol, where the information carried in the single symbol is duplicated across 2 symbols.

As indicated above, FIG. 6 is provided as an example. Other examples may differ from what is described with regard to FIG. 6.

Figure 7:
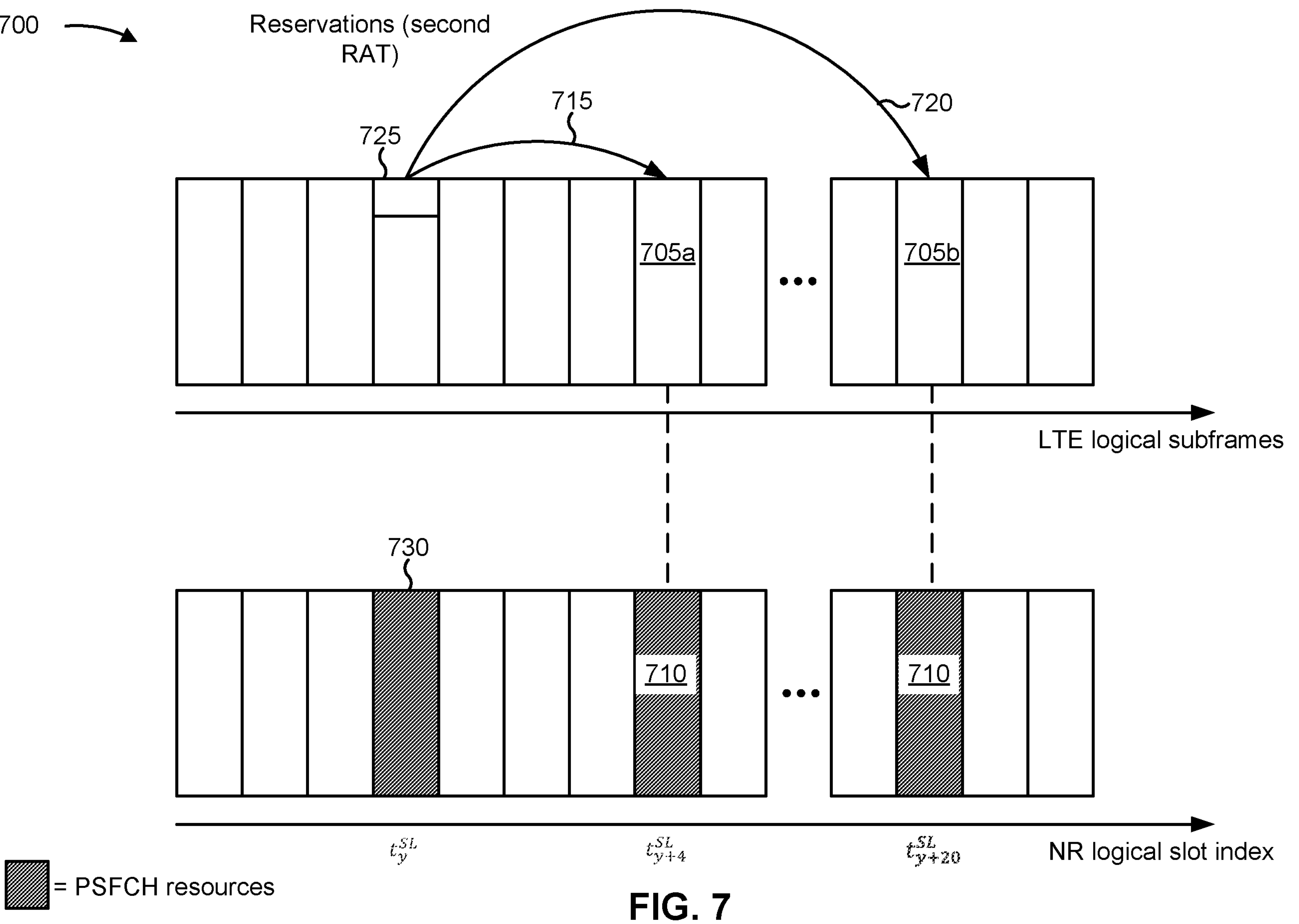
FIG. 7 is a diagram illustrating an example of reserving one or more second resources that overlap one or more first resources for a PSFCH, in accordance with the present disclosure.

FIG. 7 is a diagram illustrating an example 700 of reserving one or more second (e.g., LTE) resources 705 that overlap one or more first (e.g., NR) resources 710 for a PSFCH, in accordance with the present disclosure. The operations of example 700 may be performed by a UE 120, such as a UE 120 that incorporates the first module 500 and the second module 505 of FIG. 5 (e.g., a dual RAT UE). The first (e.g., NR) resource 710 may be associated with a first RAT (e.g., 5G/NR) and the second (e.g., LTE) resource 705 may be associated with a second RAT (e.g., 4G/LTE). For example, the first (e.g., NR) resource 710 may be a PSFCH resource (e.g., the first resource may be for a sidelink feedback channel) for the UE 120. For example, the second (e.g., LTE) resource 705 may be reserved using a 4G/LTE reservation. In example 700, the first RAT and the second RAT have a same numerology and subcarrier spacing (SCS), though the techniques described herein can also be implemented in a case where the first RAT and the second RAT have different numerologies/SCSs.

As shown, the UE 120 (e.g., the second module 505) may transmit one or more reservations 715 and 720. The reservations 715 and 720 may reserve the second (e.g., LTE) resources 705. For example, each reservation 715/720 may reserve one or more second (e.g., LTE) resources 705 (e.g., a single reservation may reserve multiple second (e.g., LTE) resources, or separate reservations may reserve separate second (e.g., LTE) resources). In some aspects, the reservations 715 and 720 may be a single reservation that indicates two or more second (e.g., LTE) resources 705. In some aspects, the reservation 715 and/or the reservation 720 may include a standalone LTE sidelink control information transmission. In some aspects, the UE 120 (e.g., the second module 505) may transmit the reservation 715 and/or 720 on an LTE subframe 725 (e.g., a resource) that collides with an NR PSFCH slot 730 (e.g., a first (e.g., NR) resource).

In some aspects, a reservation 715/720 may indicate a time gap between an initial transmission and a retransmission. For example, the reservation 715 may indicate a time gap of 4 subframes between the LTE subframe 725 and a second (e.g., LTE) resource 705*a*. In some aspects, the time gap may be set to a value (e.g., have a length) that is a factor of a periodicity of the NR sidelink PSFCH (e.g., a periodicity of slots associated with the sidelink feedback channel), as mapped to LTE logical subframes. For example, the NR sidelink PSFCH resources (the first resources 710) may be associated with a periodicity of 4 slots, which maps to every $4^{th}$ logical subframe of the LTE RAT. Therefore, the reservation 715 may indicate a time gap of 4 subframes to reserve the second (e.g., LTE) resource 705*a*.

In some aspects, the reservation 715 and/or 720 may include a resource reservation field. In some aspects, the resource reservation field of the reservation 720 may indicate a second (e.g., LTE) resource 705*b*. For example, the resource reservation field may include a value that specifies when a next transmission of the UE 120 (e.g., the second module 505) will occur. In this context, the second module 505 may not actually perform the next transmission, but the reservation 720 may cause other LTE UEs to avoid transmission that overlaps with a first (e.g., NR) resource 710. In some aspects, the value of the resource reservation field may be based at least in part on a periodicity of slots associated with the sidelink feedback channel. For example, the value may be a factor of a periodicity of the NR sidelink PSFCH resources. In this example, the value may be 20 ms, since 20 ms is a selectable value for the resource reservation field (e.g., selectable from [20 ms, 50 ms, 100 ms, 200 ms, . . . 1000 ms]) and is a factor of the periodicity (4 ms) of the NR sidelink PSFCH resources (e.g., an integer factor, such as a factor of 5). In some aspects, the resource reservation field can indicate a time offset that matches a selectable periodicity of the resource reservation field. In some aspects, the resource reservation field can indicate a periodicity (e.g., $P_{rsvp}$) that matches a selectable periodicity of the resource reservation field.

In some aspects, the reservation 715 and/or 720 may include a priority field. The priority field may indicate a priority associated with the reserved second (e.g., LTE) resource 705. In some aspects, the priority is configured for PSFCH indication. For example, the priority may be configured (such as via RRC signaling) or preconfigured (such as by an original equipment manufacturer or network operator) to a value that is associated with reserving a second (e.g., LTE) resource 705 that overlaps a first (e.g., NR) resource 710 (e.g., configured or preconfigured for NR sidelink PSFCH indication). In some aspects, the priority includes a priority associated with the second RAT (e.g., 4G/LTE). For example, the priority may be based at least in part on a highest priority indicated by the first module 500 associated with the first RAT (e.g., 5G/NR). In this example, the priority may be a highest NR priority (as indicated by the first module 500) that is mapped to an LTE proximity service per-packet priority (PPPP) value, such as a PPPP value associated with the second module 505 or the second (e.g., LTE) resource 705. In some aspects, the priority indicated by the reservation 715 and/or 720 may include a highest priority among traffic associated with the second module 505 (e.g., the second RAT). For example, the priority indicated by the reservation 715 and/or 720 may include a highest priority among all LTE traffic.

The reservation 715 and/or 720 may indicate frequency resources for the second (e.g., LTE) resource 705. For example, the frequency resources may include all PRBs in the second (e.g., LTE) resource 705 (e.g., the subframe comprising the second resource 705).

In some aspects, the PSFCH may have a first periodicity. In some aspects, the first periodicity may be equal to, or may be a factor of, an LTE sidelink reservation periodicity. For example, the first periodicity may be selected from values of 5 slots, 10 slots, or 20 slots, in addition to other configurable periodicities for the PSFCH described elsewhere herein. Thus, NR sidelink UEs can be configured with the first periodicity, which simplifies alignment of the PSFCH resources with second (e.g., LTE) resources 705 reserved by reservations 715/720, thereby reducing overhead.

As indicated above, FIG. 7 is provided as an example. Other examples may differ from what is described with regard to FIG. 7.

Figure 8:
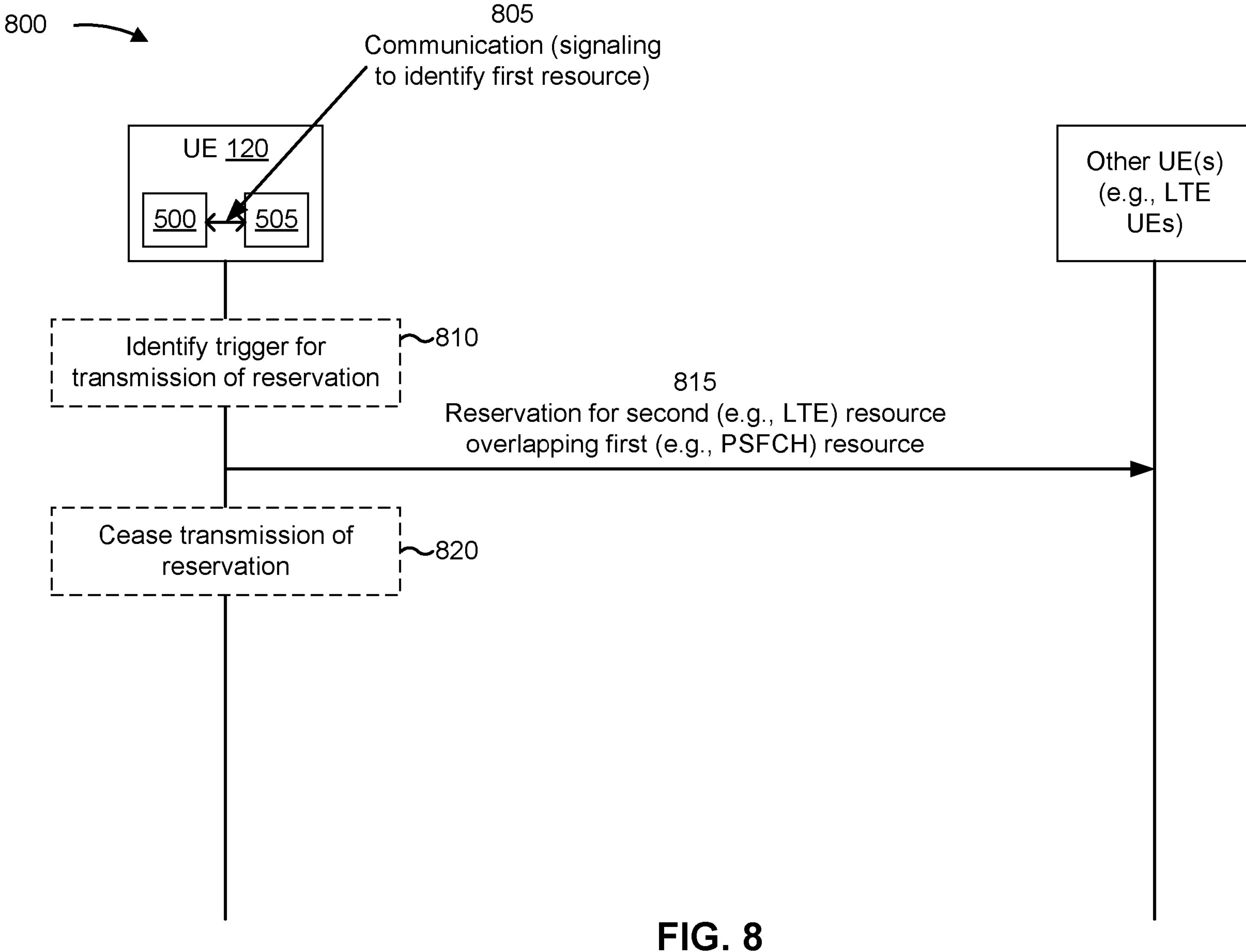
FIG. 8 is a diagram illustrating an example of signaling associated with PSFCH collision avoidance between radio access technologies, in accordance with the present disclosure.

FIG. 8 is a diagram illustrating an example 800 of signaling associated with PSFCH collision avoidance between radio access technologies, in accordance with the present disclosure. Example 800 includes a UE 120, which includes a first module 500 and a second module 505.

As shown by reference number 805, the first module 500 and the second module 505 may communicate with one another (e.g., via an interface 510). For example, the first module 500 may provide, to the second module 505, signaling indicating information which the second module may use to identify a first resource (e.g., first resource 710) associated with an NR PSFCH. This information may include, for example, a periodicity of the NR PSFCH, a location of a first PSFCH slot (e.g., first resource 710) with regard to a reference LTE subframe, a numerology of the first module 500 or the NR PSFCH (e.g., of a bandwidth part or carrier associated with the first module 500 or the NR PSFCH), one or more priorities of traffic associated with the first module 500 (e.g., NR traffic over the shared traffic), or a combination thereof. The UE 120 (e.g., the second module 505) may identify a first resource (e.g., first resource 710) for a PSFCH (e.g., an NR PSFCH) according to this information. For example, the UE 120 may use the location of the first PSFCH slot, the numerology, and the periodicity to identify the first resources 710 (or to identify second resources 705 that overlap the first resources 710).

As shown by reference number 810, in some aspects, the UE 120 (e.g., the second module 505) may identify a trigger for transmission of a reservation (e.g., reservation 715/720). For example, the UE 120 (e.g., the second module 505) may receive the trigger from an entity of the UE, such as a V2X application entity. This may be referred to as an explicit upper layer trigger. As another example, the UE 120 (e.g., the second module 505) may receive the trigger from the first module 500. For example, the UE 120 (e.g., the second module 505) may receive the trigger via the interface 510.

As shown by reference number 815, the UE 120 (e.g., the second module 505) may transmit a reservation (e.g., reservation 715 and/or reservation 720). The reservation is described in more detail in connection with FIG. 7. The reservation may be for a second resource (e.g., second resource 705), such as an LTE subframe, that at least partially overlaps a first resource (e.g., first resource 710), such as an NR PSFCH slot. For example, the reservation may indicate the second resource, as described in connection with FIG. 7. In some aspects, the UE 120 (e.g., the second module 505) may transmit multiple reservations (e.g., for respective second resources). For example, the UE 120 may periodically transmit reservations (e.g., based at least in part on a periodicity of the first resource).

In some aspects, the UE 120 (e.g., the second module 505) may transmit the reservation in accordance with a configuration. For example, the configuration may include an RRC configuration (e.g., received from a network node such as an eNB), a pre-configuration (e.g., by an original equipment manufacturer or network operator), or the like. The configuration may indicate one or more parameters for transmitting the reservation. For example, the configuration may indicate a condition that, when satisfied, causes the UE 120 to transmit the reservation. In some aspects, the condition may be associated with a channel occupancy metric, such as an LTE channel busy ratio (CBR) being above a threshold, or an NR CBR being above a threshold, or a comparison between the LTE CBR and the NR CBR. As another example, the condition may be associated with a traffic priority. For example, the UE 120 may transmit the reservation only when an LTE Tx/Rx priority is greater or equal to an NR Tx/Rx priority. As another example, the one or more parameters may indicate a periodicity for reservation transmission, a relationship between the second resource and the first resource, or the like.

As shown by reference number 820, in some aspects, the UE 120 (e.g., the second module 505) may cease transmission of the reservation. For example, the UE 120 may cease periodic transmission of the reservation (e.g., may cease periodically reserving second resources that overlap with first resources). In some aspects, the UE 120 may cease transmission of the reservation in accordance with a trigger from an upper layer of the UE 120, such as a V2X application entity (referred to herein as an explicit upper layer trigger or an explicit indication). In some aspects, the UE 120 may cease transmission of the reservation in accordance with a trigger from the first module 500 (e.g., received via the interface 510), which may be referred to herein as an explicit indication.

In some aspects, the UE 120 (e.g., the second module 505) may cease transmission of the reservation based at least in part on a sidelink control information message from another UE. For example, the UE 120 may receive the sidelink control information message from the other UE. In some aspects, the UE 120 may cease transmission of the reservation based at least in part on a measurement associated with the sidelink control information message (such as a sidelink RSRP) satisfying a threshold and/or based at least in part on the sidelink control information message indicating a reservation that at least partially overlaps the first resource. For example, the UE 120 may cease transmission of the reservation if a sidelink control information message from a neighboring UE is associated with a sidelink RSRP greater than a threshold and the sidelink control information message indicates a reservation for one or more NR PSFCH slots according to content of the sidelink control information message.

In some aspects, the UE 120 (e.g., the second module 505) may cease transmission of the reservation based at least in part on a channel busy ratio. For example, the UE 120 may cease transmission of the reservation when a CBR satisfies (e.g., is greater than, is greater than or equal to) a threshold. The CBR may be defined as a ratio of sub-channels in a time window that are associated with an RSSI higher than a threshold, to all sub-channels in the time window. Thus, the UE 120 may cease transmission of the reservation when the channel is congested.

In some aspects, the UE 120 (e.g., the second module 505) may cease transmission of the reservation based at least in part on a duty cycle of the UE 120 (e.g., the second module 505). A duty cycle may define one or more first times in which the UE 120 is permitted to perform transmissions and one or more second times in which the UE 120 is not permitted to perform transmissions. For example, a duty cycle may be implemented as a cycle, in which the one or more first times and the one or more second times are associated with a recurrence. The UE 120 may cease transmission of the reservation during the one or more second times. Thus, the UE 120 may cease transmission of the reservation based at least in part on the UE 120's transmission requirements (e.g., duty cycle).

As indicated above, FIG. 8 is provided as an example. Other examples may differ from what is described with regard to FIG. 8.

Figure 9:
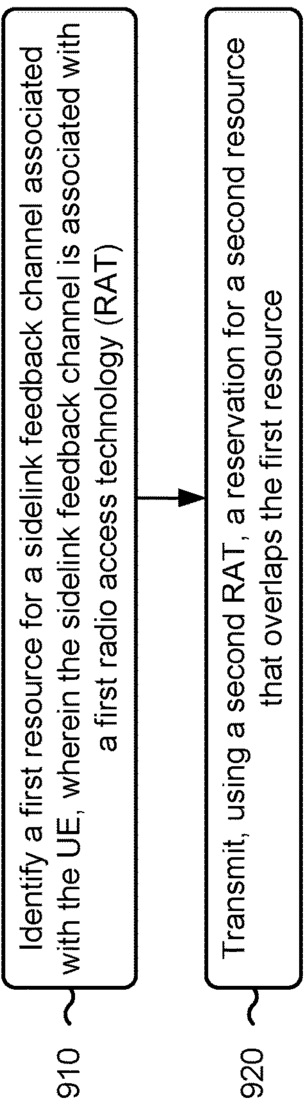
FIG. 9 is a diagram illustrating an example process performed, for example, at a UE or an apparatus of a UE, in accordance with the present disclosure.
Figure 9:

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with signaling for sidelink feedback channel collision avoidance between radio access technologies.

As shown in FIG. 9, in some aspects, process 900 may include identifying a first resource for a sidelink feedback channel associated with the UE, wherein the sidelink feedback channel is associated with a first RAT (block 910). For example, the UE (e.g., using communication manager 1006, depicted in FIG. 10) may identify a first resource for a sidelink feedback channel associated with the UE, wherein the sidelink feedback channel is associated with a first RAT, as described above.

As further shown in FIG. 9, in some aspects, process 900 may include transmitting, using a second RAT, a reservation for a second resource that overlaps the first resource (block 920). For example, the UE (e.g., using transmission component 1004 and/or communication manager 1006, depicted in FIG. 10) may transmit, using a second RAT, a reservation for a second resource that overlaps the first resource, as described above.

Process 900 may include additional aspects, such as any single aspect or any combination of aspects described below and/or in connection with one or more other processes described elsewhere herein.

In a first aspect, the first RAT is a 5G or New Radio RAT and the second RAT is a Long Term Evolution or 4G RAT.

In a second aspect, alone or in combination with the first aspect, identifying the first resource further comprises identifying the first resource according to signaling from a first module, of the UE, associated with the first RAT.

In a third aspect, alone or in combination with one or more of the first and second aspects, the signaling includes at least one of a periodicity of the sidelink feedback channel, a location of the sidelink feedback channel or the first resource, a numerology associated with the sidelink feedback channel, or a priority of traffic associated with the first RAT.

In a fourth aspect, alone or in combination with one or more of the first through third aspects, transmitting the reservation further comprises transmitting the reservation in association with a second module, of the UE, associated with the second RAT.

In a fifth aspect, alone or in combination with one or more of the first through fourth aspects, the reservation comprises a Long Term Evolution sidelink control information message.

In a sixth aspect, alone or in combination with one or more of the first through fifth aspects, transmitting the reservation for the second resource further comprises transmitting the reservation on a resource that collides with a slot associated with the sidelink feedback channel.

In a seventh aspect, alone or in combination with one or more of the first through sixth aspects, the reservation indicates a time gap between an initial transmission associated with the reservation and a retransmission associated with the reservation, wherein the time gap has a length based at least in part on a periodicity of slots associated with the sidelink feedback channel.

In an eighth aspect, alone or in combination with one or more of the first through seventh aspects, a resource reservation field of the reservation uses a value that is based at least in part on a periodicity of slots associated with the sidelink feedback channel.

In a ninth aspect, alone or in combination with one or more of the first through eighth aspects, the reservation indicates a priority that is configured for sidelink feedback channel indication.

In a tenth aspect, alone or in combination with one or more of the first through ninth aspects, the reservation indicates a priority, associated with the second RAT, that is based at least in part on a highest priority indicated by a first module of the UE associated with the first RAT.

In an eleventh aspect, alone or in combination with one or more of the first through tenth aspects, the reservation indicates a priority that is based at least in part on traffic associated with the second RAT.

In a twelfth aspect, alone or in combination with one or more of the first through eleventh aspects, the sidelink feedback channel has a first periodicity that is based at least in part on a selectable periodicity of the reservation.

In a thirteenth aspect, alone or in combination with one or more of the first through twelfth aspects, the first periodicity is equal to 5, 10, or 20 slots.

In a fourteenth aspect, alone or in combination with one or more of the first through thirteenth aspects, transmitting the reservation further comprises transmitting the reservation in accordance with a configuration.

In a fifteenth aspect, alone or in combination with one or more of the first through fourteenth aspects, transmitting the reservation further comprises transmitting the reservation in accordance with a trigger from an upper layer of the UE.

In a sixteenth aspect, alone or in combination with one or more of the first through fifteenth aspects, transmitting the reservation further comprises transmitting the reservation in accordance with a trigger from a first module of the UE associated with the first RAT.

In a seventeenth aspect, alone or in combination with one or more of the first through sixteenth aspects, process 900 includes ceasing transmission of the reservation in accordance with a trigger from an upper layer of the UE or a first module of the UE associated with the first RAT.

In an eighteenth aspect, alone or in combination with one or more of the first through seventeenth aspects, process 900 includes receiving a sidelink control information message from another UE, and ceasing transmission of the reservation based at least in part on the sidelink control information message.

In a nineteenth aspect, alone or in combination with one or more of the first through eighteenth aspects, process 900 includes ceasing transmission of the reservation based at least in part on a channel busy ratio.

In a twentieth aspect, alone or in combination with one or more of the first through nineteenth aspects, process 900 includes ceasing transmission of the reservation based at least in part on a duty cycle of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
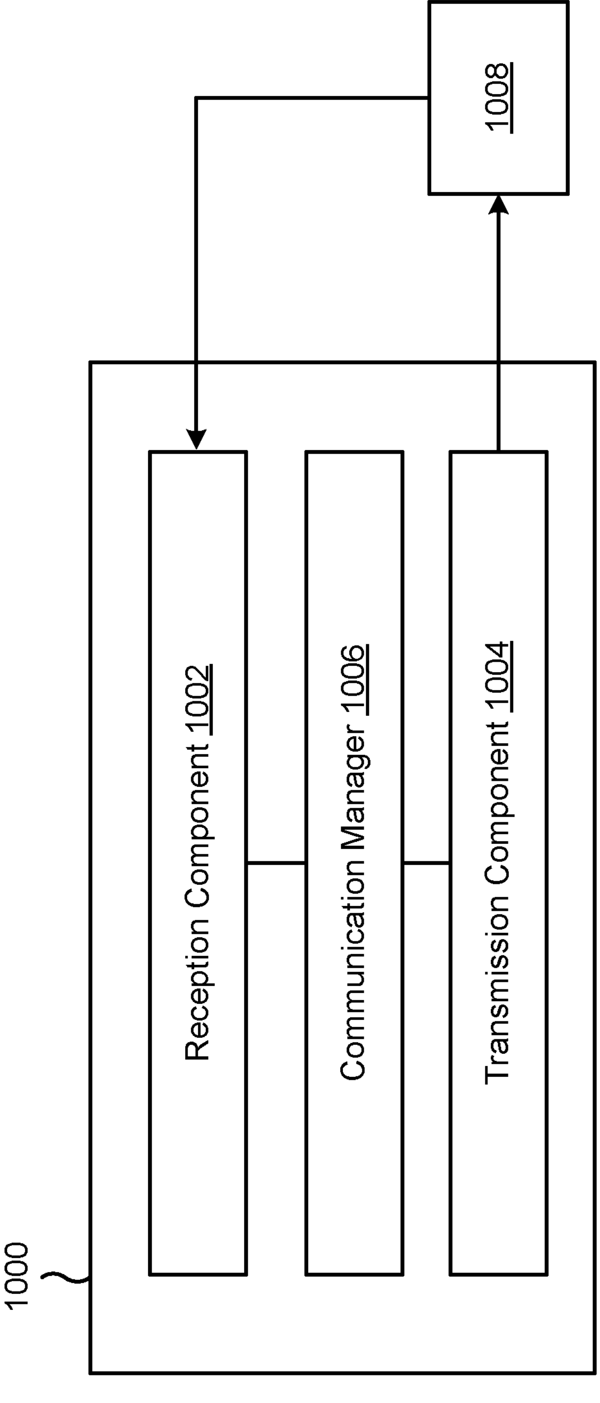
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 3-8. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may identify a first resource for a sidelink feedback channel associated with the UE, wherein the sidelink feedback channel is associated with a first RAT. The transmission component 1004 may transmit, using a second RAT, a reservation for a second resource that overlaps the first resource.

The communication manager 1006 may cease transmission of the reservation in accordance with a trigger from an upper layer of the UE or a first module of the UE associated with the first RAT.

The reception component 1002 may receive a sidelink control information message from another UE.

The communication manager 1006 may cease transmission of the reservation based at least in part on the sidelink control information message.

The communication manager 1006 may cease transmission of the reservation based at least in part on a channel busy ratio.

The communication manager 1006 may cease transmission of the reservation based at least in part on a duty cycle of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: identifying a first resource for a sidelink feedback channel associated with the UE, wherein the sidelink feedback channel is associated with a first radio access technology (RAT); and transmitting, using a second RAT, a reservation for a second resource that overlaps the first resource.

Aspect 2: The method of Aspect 1, wherein the first RAT is a 5G or New Radio RAT and the second RAT is a Long Term Evolution or 4G RAT.

Aspect 3: The method of any of Aspects 1-2, wherein identifying the first resource further comprises identifying the first resource according to signaling from a first module, of the UE, associated with the first RAT.

Aspect 4: The method of Aspect 3, wherein the signaling includes at least one of: a periodicity of the sidelink feedback channel, a location of the sidelink feedback channel or the first resource, a numerology associated with the sidelink feedback channel, or a priority of traffic associated with the first RAT.

Aspect 5: The method of any of Aspects 1-4, wherein transmitting the reservation further comprises transmitting the reservation in association with a second module, of the UE, associated with the second RAT.

Aspect 6: The method of any of Aspects 1-5, wherein the reservation comprises a Long Term Evolution sidelink control information message.

Aspect 7: The method of any of Aspects 1-6, wherein transmitting the reservation for the second resource further comprises transmitting the reservation on a resource that collides with a slot associated with the sidelink feedback channel.

Aspect 8: The method of any of Aspects 1-7, wherein the reservation indicates a time gap between an initial transmission associated with the reservation and a retransmission associated with the reservation, wherein the time gap has a length based at least in part on a periodicity of slots associated with the sidelink feedback channel.

Aspect 9: The method of any of Aspects 1-8, wherein a resource reservation field of the reservation uses a value that is based at least in part on a periodicity of slots associated with the sidelink feedback channel.

Aspect 10: The method of any of Aspects 1-9, wherein the reservation indicates a priority that is configured for sidelink feedback channel indication.

Aspect 11: The method of any of Aspects 1-10, wherein the reservation indicates a priority, associated with the second RAT, that is based at least in part on a highest priority indicated by a first module of the UE associated with the first RAT.

Aspect 12: The method of any of Aspects 1-11, wherein the reservation indicates a priority that is based at least in part on traffic associated with the second RAT.

Aspect 13: The method of any of Aspects 1-12, wherein the sidelink feedback channel has a first periodicity that is based at least in part on a selectable periodicity of the reservation.

Aspect 14: The method of Aspect 13, wherein the first periodicity is equal to 5, 10, or 20 slots.

Aspect 15: The method of any of Aspects 1-14, wherein transmitting the reservation further comprises transmitting the reservation in accordance with a configuration.

Aspect 16: The method of any of Aspects 1-15, wherein transmitting the reservation further comprises transmitting the reservation in accordance with a trigger from an upper layer of the UE.

Aspect 17: The method of any of Aspects 1-16, wherein transmitting the reservation further comprises transmitting the reservation in accordance with a trigger from a first module of the UE associated with the first RAT.

Aspect 18: The method of any of Aspects 1-17, further comprising ceasing transmission of the reservation in accordance with a trigger from an upper layer of the UE or a first module of the UE associated with the first RAT.

Aspect 19: The method of any of Aspects 1-18, further comprising: receiving a sidelink control information message from another UE; and ceasing transmission of the reservation based at least in part on the sidelink control information message.

Aspect 20: The method of any of Aspects 1-19, further comprising ceasing transmission of the reservation based at least in part on a channel busy ratio.

Aspect 21: The method of any of Aspects 1-20, further comprising ceasing transmission of the reservation based at least in part on a duty cycle of the UE.

Aspect 22: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-21.

Aspect 23: An apparatus for wireless communication at a device, the apparatus comprising one or more memories and one or more processors coupled to the one or more memories, the one or more processors configured to cause the device to perform the method of one or more of Aspects 1-21.

Aspect 24: An apparatus for wireless communication, the apparatus comprising at least one means for performing the method of one or more of Aspects 1-21.

Aspect 25: A non-transitory computer-readable medium storing code for wireless communication, the code comprising instructions executable by one or more processors to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

Aspect 27: A device for wireless communication, the device comprising a processing system that includes one or more processors and one or more memories coupled with the one or more processors, the processing system configured to cause the device to perform the method of one or more of Aspects 1-21.

Aspect 28: An apparatus for wireless communication at a device, the apparatus comprising one or more memories and one or more processors coupled to the one or more memories, the one or more processors individually or collectively configured to cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
- one or more memories; and
- one or more processors, coupled to the one or more memories, configured to cause the UE to:
  - identify a first resource for a sidelink feedback channel associated with the UE, wherein the sidelink feedback channel is associated with a first radio access technology (RAT);
  - transmit, using a second RAT, a reservation for a second resource that overlaps the first resource, the reservation being transmitted in accordance with a configuration parameter indicating a set of physical resource blocks reserved for the sidelink feedback channel;
  - receive a sidelink control information message from another UE; and
  - cease transmission of the reservation based at least in part on the sidelink control information message.

2. The apparatus of claim 1, wherein the first RAT is a 5G or New Radio RAT and the second RAT is a Long Term Evolution or 4G RAT.

3. The apparatus of claim 1, wherein the one or more processors, to cause the UE to identify the first resource, are configured to cause the UE to identify the first resource according to signaling from a first module, of the UE, associated with the first RAT.

4. The apparatus of claim 3, wherein the signaling includes at least one of:
- a periodicity of the sidelink feedback channel,
- a location of the sidelink feedback channel or the first resource,
- a numerology associated with the sidelink feedback channel, or
- a priority of traffic associated with the first RAT.

5. The apparatus of claim 1, wherein the one or more processors, to cause the UE to transmit the reservation, are configured to cause the UE to transmit the reservation in association with a second module, of the UE, associated with the second RAT.

6. The apparatus of claim 1, wherein the reservation comprises a Long Term Evolution sidelink control information message.

7. The apparatus of claim 1, wherein the one or more processors, to cause the UE to transmit the reservation for the second resource, are configured to cause the UE to transmit the reservation on a resource that collides with a slot associated with the sidelink feedback channel.

8. The apparatus of claim 1, wherein the reservation indicates a time gap between an initial transmission associated with the reservation and a retransmission associated with the reservation, wherein the time gap has a length based at least in part on a periodicity of slots associated with the sidelink feedback channel.

9. The apparatus of claim 1, wherein a resource reservation field of the reservation uses a value that is based at least in part on a periodicity of slots associated with the sidelink feedback channel.

10. The apparatus of claim 1, wherein the reservation indicates a priority that is configured for sidelink feedback channel indication.

11. The apparatus of claim 1, wherein the reservation indicates a priority, associated with the second RAT, that is based at least in part on a highest priority indicated by a first module of the UE associated with the first RAT.

12. The apparatus of claim 1, wherein the reservation indicates a priority that is based at least in part on traffic associated with the second RAT.

13. The apparatus of claim 1, wherein the sidelink feedback channel has a first periodicity that is based at least in part on a selectable periodicity of the reservation.

14. The apparatus of claim 13, wherein the first periodicity is equal to 5, 10, or 20 slots.

15. The apparatus of claim 1, wherein the one or more processors, to cause the UE to transmit the reservation, are configured to cause the UE to transmit the reservation in accordance with a configuration.

16. The apparatus of claim 1, wherein the one or more processors, to cause the UE to transmit the reservation, are configured to cause the UE to transmit the reservation in accordance with a trigger from an upper layer of the UE.

17. The apparatus of claim 1, wherein the one or more processors, to cause the UE to transmit the reservation, are configured to cause the UE to transmit the reservation in accordance with a trigger from a first module of the UE associated with the first RAT.

18. The apparatus of claim 1, wherein the one or more processors are further configured to cause the UE to cease transmission of the reservation in accordance with a trigger from an upper layer of the UE or a first module of the UE associated with the first RAT.

19. The apparatus of claim 1, wherein the one or more processors are further configured to cause the UE to cease transmission of the reservation based at least in part on a channel busy ratio.

20. The apparatus of claim 1, wherein the one or more processors are further configured to cause the UE to cease transmission of the reservation based at least in part on a duty cycle of the UE.

21. A method of wireless communication, comprising:

identifying a first resource for a sidelink feedback channel associated with a user equipment (UE), wherein the sidelink feedback channel is associated with a first radio access technology (RAT);

transmitting, using a second RAT, a reservation for a second resource that overlaps the first resource, the reservation being transmitted in accordance with a configuration parameter indicating a set of physical resource blocks reserved for the sidelink feedback channel;

receiving a sidelink control information message from another UE; and ceasing transmission of the reservation based at least in part on the sidelink control information message.

22. The method of claim 21, wherein the first RAT is a 5G or New Radio RAT and the second RAT is a Long Term Evolution or 4G RAT.

23. The method of claim 21, wherein identifying the first resource further comprises identifying the first resource according to signaling from a first module, of the UE, associated with the first RAT.

24. The method of claim 23, wherein the signaling includes at least one of:

a periodicity of the sidelink feedback channel, a location of the sidelink feedback channel or the first resource, a numerology associated with the sidelink feedback channel, or a priority of traffic associated with the first RAT.

25. The method of claim 21, wherein transmitting the reservation further comprises transmitting the reservation in association with a second module, of the UE, associated with the second RAT.

26. The method of claim 21, wherein the reservation comprises a Long Term Evolution sidelink control information message.

27. The method of claim 21, wherein transmitting the reservation for the second resource further comprises transmitting the reservation on a resource that collides with a slot associated with the sidelink feedback channel.

28. A non-transitory computer-readable medium storing a set of instructions for wireless communication, the set of instructions comprising:

one or more instructions that, when executed by one or more processors of a user equipment (UE), cause the UE to:

identify a first resource for a sidelink feedback channel associated with the UE, wherein the sidelink feedback channel is associated with a first radio access technology (RAT);

transmit, using a second RAT, a reservation for a second resource that overlaps the first resource, the reservation being transmitted in accordance with a configuration parameter indicating a set of physical resource blocks reserved for the sidelink feedback channel;

receive a sidelink control information message from another UE; and cease transmission of the reservation based at least in part on the sidelink control information message.

29. An apparatus for wireless communication, comprising:

means for identifying a first resource for a sidelink feedback channel associated with the apparatus, wherein the sidelink feedback channel is associated with a first radio access technology (RAT);

means for transmitting, using a second RAT, a reservation for a second resource that overlaps the first resource, the reservation being transmitted in accordance with a configuration parameter indicating a set of physical resource blocks reserved for the sidelink feedback channel;

means for receiving a sidelink control information message from another apparatus for wireless communication; and means for ceasing transmission of the reservation based at least in part on the sidelink control information message.

30. The method of claim 21, wherein ceasing transmission of the reservation is further based at least in part on at least one of a channel busy ratio or a duty cycle of the UE.

* * * * *